US012129613B2

(12) United States Patent
Faulkenberry et al.

(10) Patent No.: US 12,129,613 B2
(45) Date of Patent: Oct. 29, 2024

(54) SYSTEM, METHOD, AND APPARATUS FOR CABLE BARRIER

(71) Applicant: Gibraltar Global LLC, Burnet, TX (US)

(72) Inventors: Ronald Faulkenberry, Burnet, TX (US); Jerry G. McGee, Newport Beach, CA (US); William H. Neusch, Marble Falls, TX (US)

(73) Assignee: Gibraltar Global LLC, Burnet, TX (US)

( * ) Notice: Subject to any disclaimer, the term of this patent is extended or adjusted under 35 U.S.C. 154(b) by 0 days.

(21) Appl. No.: 18/504,596

(22) Filed: Nov. 8, 2023

(65) Prior Publication Data

US 2024/0076842 A1 Mar. 7, 2024

Related U.S. Application Data

(60) Division of application No. 18/239,202, filed on Aug. 29, 2023, which is a continuation of application No. 17/006,207, filed on Aug. 28, 2020, now Pat. No. 11,773,548.

(51) Int. Cl.
*E01F 15/06* (2006.01)
*E04H 17/10* (2006.01)

(52) U.S. Cl.
CPC ........... *E01F 15/06* (2013.01); *E04H 17/124* (2021.01)

(58) Field of Classification Search
CPC ......... E01F 15/02; E01F 15/06; E01F 15/065; E04H 17/02; E04H 17/04; E04H 17/06; E04H 17/10; E04H 17/12; E04H 17/124
See application file for complete search history.

(56) References Cited

U.S. PATENT DOCUMENTS

| 315,767   | A |   | 4/1885  | Goodwin    |            |
|-----------|---|---|---------|------------|------------|
| 341,359   | A | * | 5/1886  | Stillman   | E04H 17/124 |
|           |   |   |         |            | 256/54     |
| 388,086   | A | * | 8/1888  | Spoore     | E04H 17/12 |
|           |   |   |         |            | 256/56     |
| 469,492   | A |   | 2/1892  | Weeks      |            |
| 704,035   | A | * | 7/1902  | Henry      | E04H 17/12 |
|           |   |   |         |            | 52/836     |
| 799,813   | A |   | 9/1905  | Warneke    |            |
| 834,867   | A |   | 10/1906 | Biesemeier |            |
| 2,317,249 | A |   | 4/1943  | Brickman   |            |
| 2,321,988 | A |   | 6/1943  | Brickman   |            |
| 3,210,051 | A |   | 10/1965 | Case       |            |

(Continued)

FOREIGN PATENT DOCUMENTS

CN 106049318 A 10/2016
GB 191021248 A 4/1911
(Continued)

*Primary Examiner* — Josh Skroupa
*Assistant Examiner* — Kevin J Baynes
(74) *Attorney, Agent, or Firm* — Dickinson Wright PLLC

(57) ABSTRACT

A cable barrier assembly or system can include line posts extending along a barrier section. Cables can extend along the line posts. In addition, each line post can have a total number of cable retention features that is less than a total number of the cables. Each cable retention feature can include at least a partial loop that limits a range of radial motion of a cable extending through an eye of the partial loop, relative to an axis of the cable.

15 Claims, 6 Drawing Sheets

(56) References Cited

U.S. PATENT DOCUMENTS

| | | | |
|---|---|---|---|
| 3,450,387 A * | 6/1969 | Albert | E04H 17/124 |
| | | | 256/13.1 |
| 3,567,184 A | 3/1971 | Yancey | |
| 3,671,017 A | 6/1972 | Sachs | |
| 3,972,511 A | 8/1976 | Balestrini | |
| 4,436,284 A | 3/1984 | Varela-Hernandez | |
| 4,920,724 A | 5/1990 | Leach et al. | |
| 5,004,211 A | 4/1991 | Rayner | |
| 5,039,066 A | 8/1991 | Stacey | |
| 5,651,521 A | 7/1997 | Aberg | |
| 5,896,722 A | 4/1999 | Swenson | |
| 6,065,738 A | 5/2000 | Pearce et al. | |
| 6,293,521 B1 | 9/2001 | Parrish | |
| 6,655,105 B2 | 12/2003 | Swenson | |
| 6,902,151 B1 | 6/2005 | Nilsson | |
| 6,932,327 B2 | 8/2005 | Alberson et al. | |
| 6,948,703 B2 | 9/2005 | Alberson et al. | |
| 6,962,328 B2 | 11/2005 | Bergendahl | |
| 7,364,137 B2 | 4/2008 | Neusch | |
| 7,377,083 B2 | 5/2008 | McCafferty et al. | |
| 7,398,960 B2 | 7/2008 | Neusch | |
| 8,246,013 B2 | 8/2012 | Mauer et al. | |
| 8,973,903 B2 | 3/2015 | Akerstrom | |
| 8,992,116 B2 | 3/2015 | Sloan et al. | |
| 9,121,149 B2 | 9/2015 | Sharp et al. | |
| 9,228,306 B2 | 1/2016 | Neusch | |
| 11,591,760 B2 | 2/2023 | Allington et al. | |
| 11,773,548 B2 | 10/2023 | Faulkenberry et al. | |
| 2008/0296546 A1 | 12/2008 | Bergendahl | |
| 2009/0146121 A1 | 6/2009 | Sharp et al. | |
| 2010/0090185 A1 | 4/2010 | Mauer et al. | |
| 2019/0032292 A1 | 1/2019 | Allington et al. | |

FOREIGN PATENT DOCUMENTS

| | | | | |
|---|---|---|---|---|
| GB | 1487562 A | | 10/1977 | |
| GB | 2458696 A | * | 9/2009 | ............ E01F 15/025 |
| GB | 2469382 A | * | 10/2010 | .......... E01F 15/0461 |
| WO | 2005040499 A1 | | 5/2005 | |
| WO | 2007129914 A1 | | 11/2007 | |
| WO | 2012037607 A1 | | 3/2012 | |

* cited by examiner

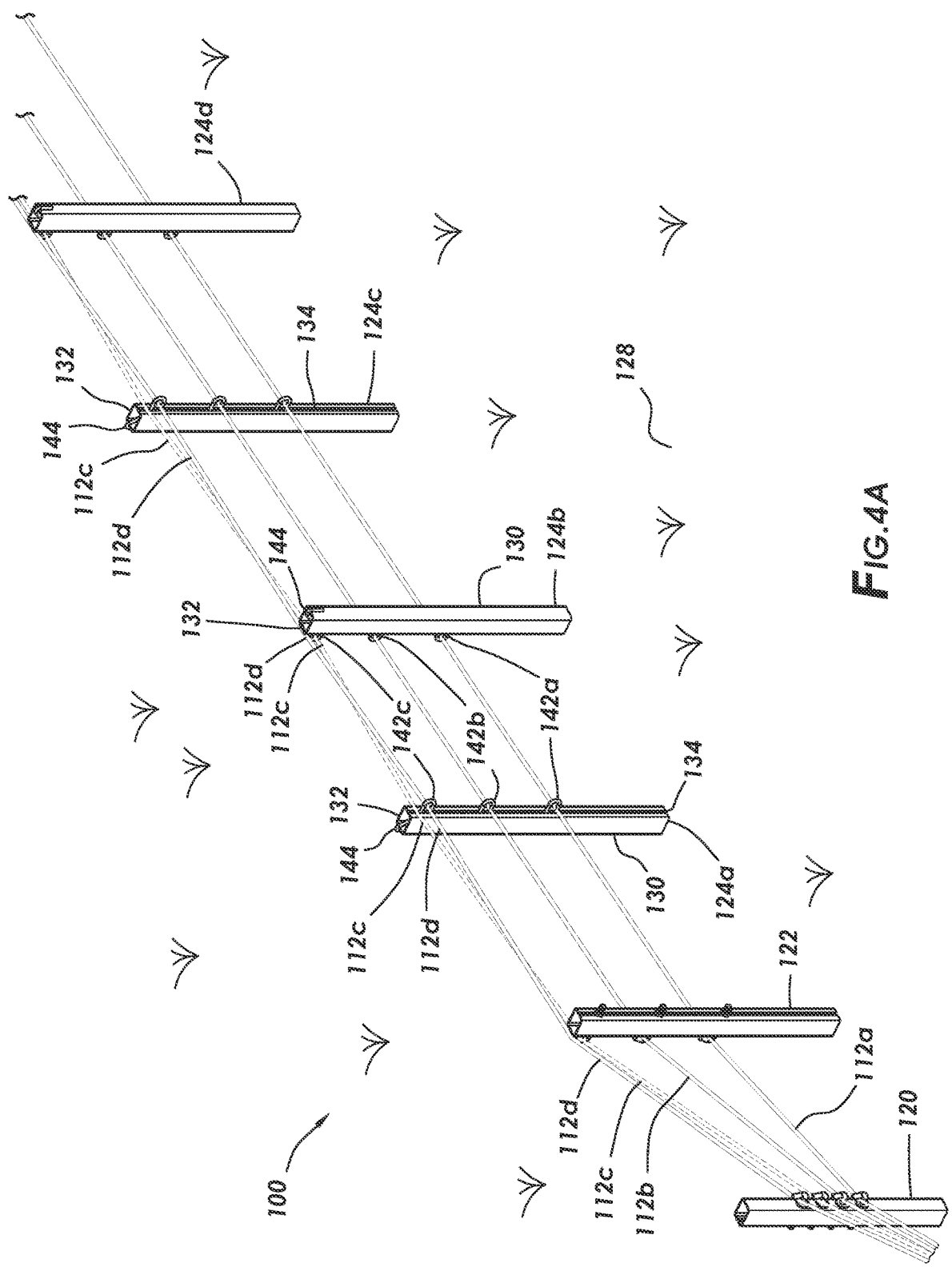

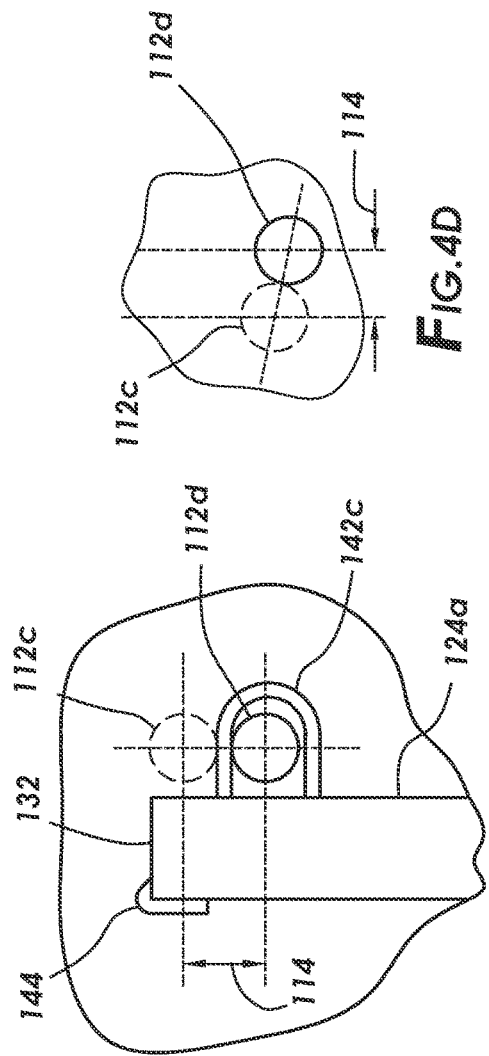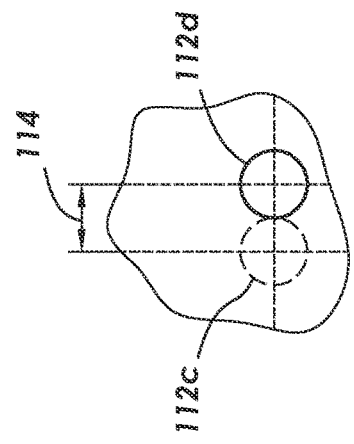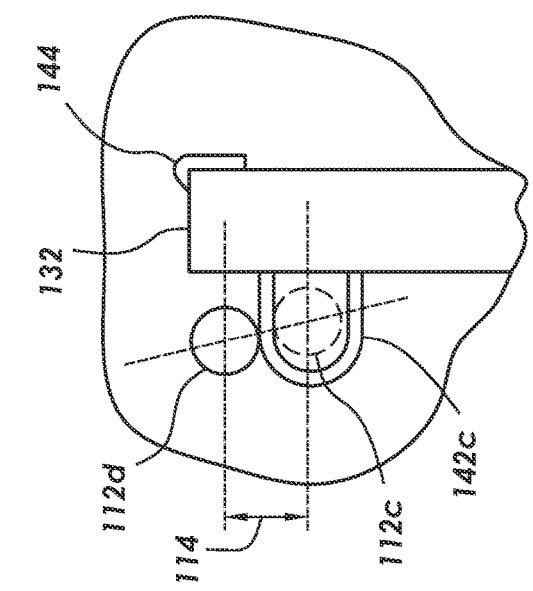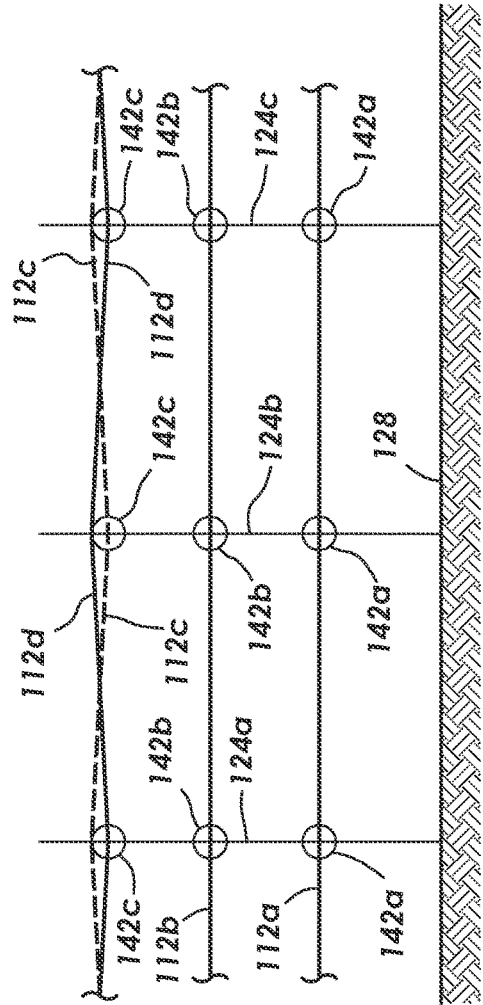

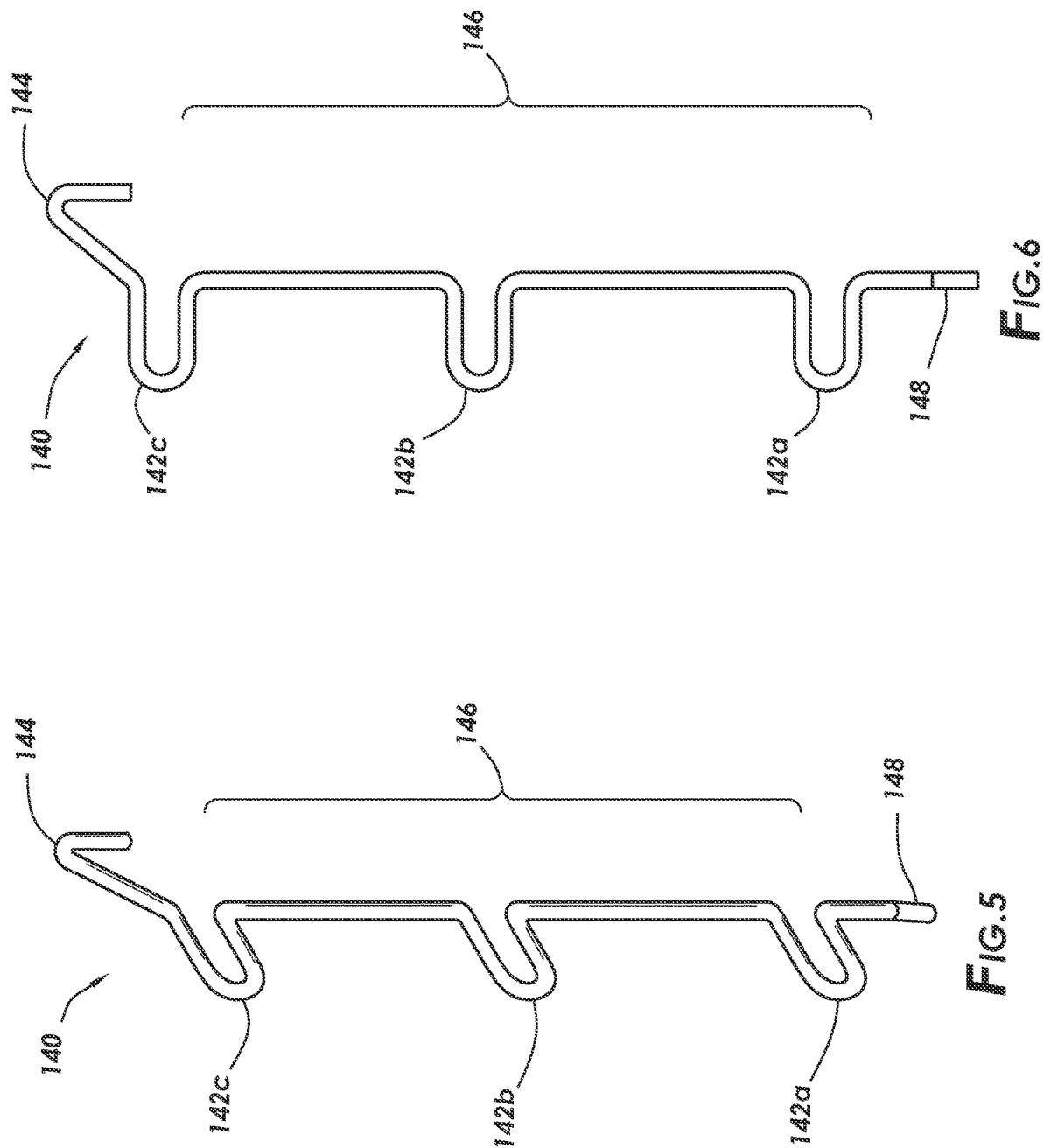

SYSTEM, METHOD, AND APPARATUS FOR CABLE BARRIER

CROSS-REFERENCE TO RELATED APPLICATIONS

This application is a division of and claims priority to and the benefit of U.S. application Ser. No. 18/239,202, filed Aug. 29, 2023, which is a continuation of and claims priority to and the benefit of U.S. application Ser. No. 17/006,207, filed Aug. 28, 2020 (which is now U.S. Pat. No. 11,773,548), each of which is incorporated herein by reference in its entirety.

BACKGROUND

The present disclosure relates to barriers and safety systems and, more particularly, to cable safety systems. Cable barrier systems are often employed to redirect motor vehicles toward a less hazardous path. Often, cable barrier systems are utilized along roadways and in the medians between roadways. For example, cable barrier systems can be utilized to redirect an errant motor vehicle headed through a median toward oncoming traffic back into the intended direction of travel or prevent a roadway departure on the side of a road.

Cable barrier systems employ high tension, steel cables supported and restrained on posts mounted in the ground. During a vehicle impact with the safety system, the posts and cables work together to redirect the vehicle. It is important that the system is sturdy enough redirect the vehicle, yet not so rigid that it causes extraordinary harm to the occupants of the vehicle. Often during a collision event, the posts impacted are bent and the cables supported and restrained by the impacted post can be pulled downward with the impacted post, which can reduce the effectiveness of the cable barrier system. Some cable barrier systems employ release mechanisms to release the cables from post restraint upon impact. Although such systems are workable, improvements in cable barrier systems continue to be of interest.

SUMMARY

Embodiments of a cable barrier assembly or system can include a plurality of line posts extending along a barrier section. A plurality of cables can extend along the line posts. In addition, each line post can have a total number of cable retention features that is less than a total number of the cables. Each cable retention feature can include at least a partial loop that limits a range of radial motion of a cable extending through an eye of the partial loop, relative to an axis of the cable.

Other embodiments of a cable barrier assembly can include a plurality of line posts extending along a barrier section. A plurality of cables can extend along the line posts comprising first, second, third and fourth cables. The first and second cables of the plurality of cables can be aligned in vertical elevation and touching between adjacent ones of the line posts. In addition, the first and second cables can be not aligned in vertical elevation and not touching at the line posts, such that the first cable is separated from the second cable at the line posts.

Another version of a cable barrier assembly can include a plurality of line posts extending along a barrier section. A plurality of cables can extend along the line posts. At least some of the cables can be secured to each line post. However, not every line post is secured to all of the cables, in some versions.

Embodiments of a method for releasably connecting cables to posts in a roadway cable barrier system also is disclosed. The method can include mounting a first cable to a first post such that the first cable is substantially restrained in all radial directions other than upper vertical directions. The method also can include extending a second cable adjacent to the first post such that the second cable is unrestrained in upper vertical radial directions and in other radial directions. In addition, the method can include mounting a second cable to a second post such that the second cable is substantially restrained by the second post. Versions of the method can include extending the first cable adjacent to the second post such that the first cable is substantially unrestrained by the second post.

BRIEF DESCRIPTION OF THE DRAWINGS

For a detailed description of example embodiments, reference will now be made to the accompanying drawings in which:

FIG. 4A is an isometric view of a portion of an embodiment of the cable barrier system of FIG. 3.

FIGS. 4B-4E are enlarged, sectional axial views of embodiments of the cable barrier system of FIG. 4A at different areas thereof.

FIG. 4F is an exaggerated, schematic side view of a portion of the cable barrier system of FIG. 4A.

FIG. 5 is an isometric view of an embodiment of a hairpin connector.

FIG. 6 is a side view of the connector of FIG. 5.

DEFINITIONS

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
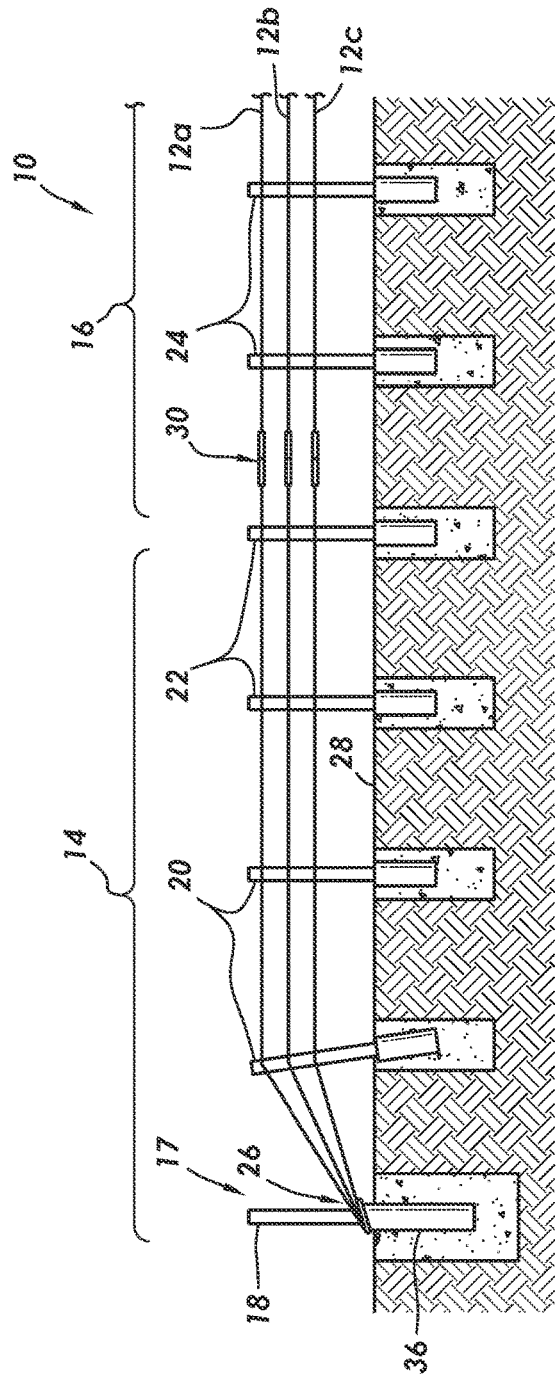
FIG. 1 is a schematic sectional side view of an embodiment of a cable barrier system.

FIG. 1 is a schematic sectional view of a cable barrier assembly or system, identified by the numeral 10. Cable barrier system 10 can include cables 12a, 12b, and 12c (collectively, cables 12) held in tension from a terminal end 14 through a barrier section, or length of need 16. Cable barrier system 10 may include additional terminal ends 14 and intermediate terminal ends (not shown). System 10 is illustrated and described herein as an example of a three-cable, highway median safety barrier, or cable guardrail. However, it should be realized that the various systems, assemblies, members and concepts described herein may be utilized in various installations and configurations for varying purposes. It should further be understood that various components of these embodiments can be utilized with various types and designs of barrier systems including, but not limited to, cable barrier systems, W-beam guardrail systems, crash cushions and attenuators.

Embodiments of terminal end 14 can include a cable-release anchor 17 having a leveraging member 18 and foundation 36, one or more weak terminal posts 20, and one or more standard terminal posts 22. The terminal ends 26 of cables 12 can be removably mounted to cable-release anchor 17 substantially at ground level 28 and removably connected to terminal posts 20, 22 and line posts 24 of length of need (LON) section 16. The term 'substantially' can be defined as to a great or significant extent, for the most part, or essentially. Cables 12 can have turnbuckles 30 and can be angled upward relative to ground level 28 through a portion of terminal end section 14 until the desired distance above ground level 28 is obtained. Terminal end 14 can be a gated terminal wherein substantially no resistance is provided upon impact by an errant vehicle.

In some versions, the length of need section 16 can include a plurality of spaced line posts 24. Cables 12 can be removably connected to line posts 24 in tension. The length of need 16 may be any desired length. The system 10 can include a variety of fittings, such as the cable splice fittings disclosed in U.S. Pat. No. 9,228,306, issued on Jan. 5, 2016, which is incorporated herein by reference in its entirety. Any of the systems, methods and components disclosed in U.S. Pat. No. 9,228,306 can be adapted and employed in this disclosure.

Embodiments of the cables 12 can be releasably connected to terminal posts 20, 22 and line posts 24 in a manner such that when an individual post fails and is moved toward the ground level 28, the cables 12 are released from that individual post. For example, if a vehicle 38 (FIG. 2) impacts cable barrier system 10 in length of need section 16 and collapses one line post 24 toward the ground level 28, cables 12 can be released from that line post 24 so that cables 12 remain supported above ground level 28 and in contact with the vehicle 38 and do not go under the vehicle. The cables 12 can remain supported above ground level by the remaining portion of the cable barrier system 10, thereby urging the vehicle 38 back to its designated and desired path (i.e., roadway).

Figure 2:
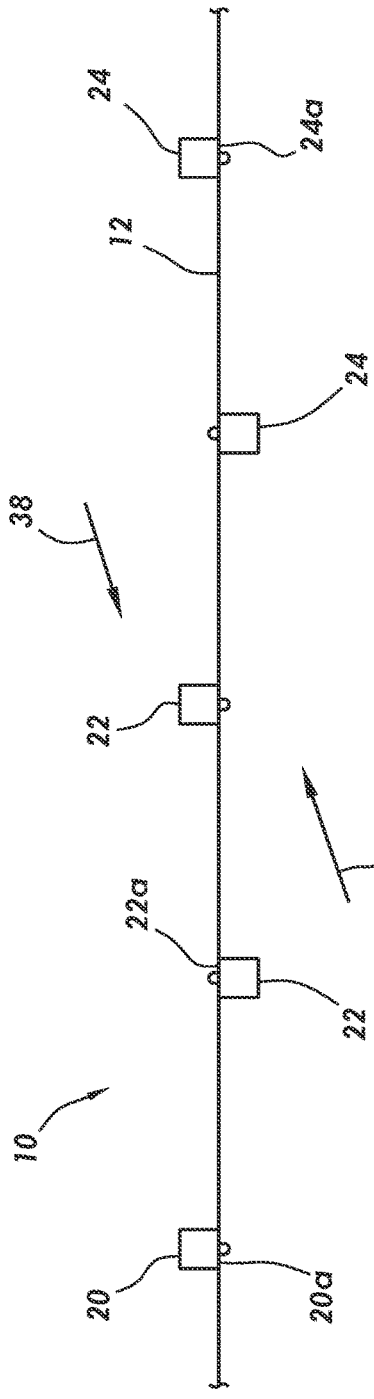
FIG. 2 is a schematic top view of a portion of an embodiment of a cable barrier system.
Figure 3:
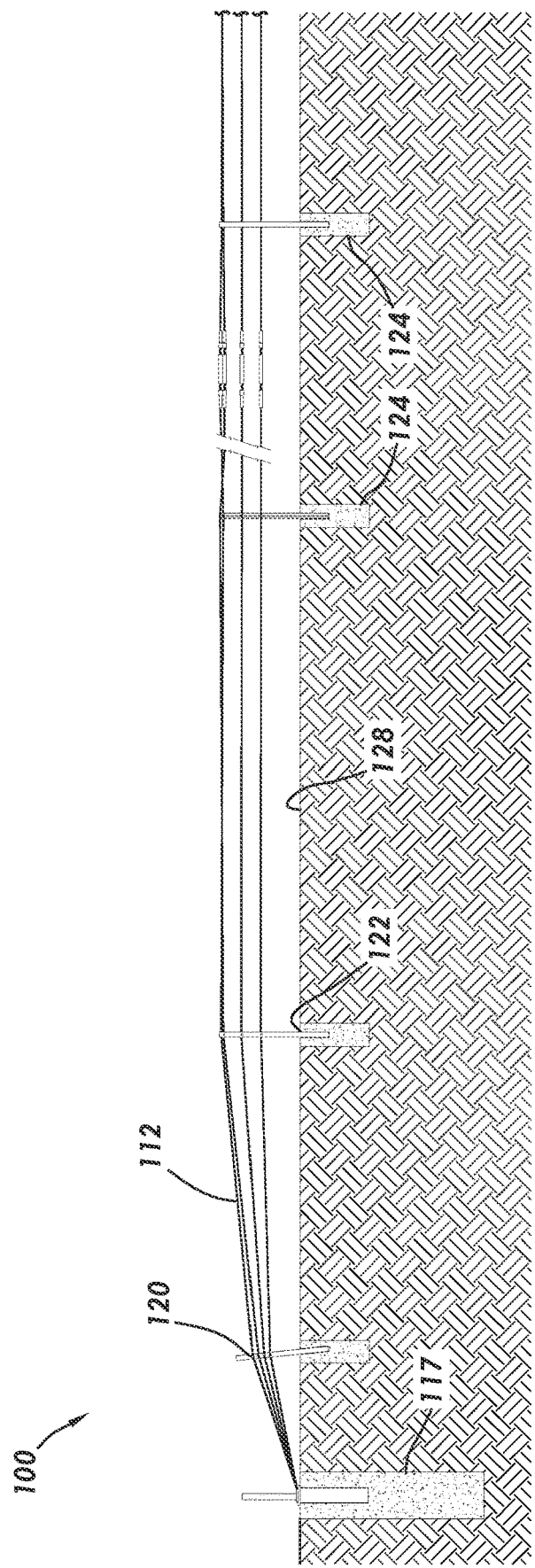
FIG. 3 is a schematic sectional side view of another embodiment of a cable barrier system.

In FIG. 2, the system 10 illustrates one example of mounting the system 10 for absorbing impact from the errant vehicles 38 and redirecting them from two directions, such as for highway medians. Arrows 38 illustrate the direction of travel of vehicles impacting system 10. Posts 20, 22, and 24 can each have a face 20a, 22a, and 24a respectively, adapted for removably mounting cables 12. The post faces 20a, 22a, and 24a can be desirably oriented to face oncoming vehicles such that cables 12 are positioned between posts 20, 22, and 24 and the direction of vehicle travel 38. For applications wherein it is probable that vehicles may impact from either direction, posts 20, 22, and 24 may be installed such that at least a portion of post faces 20a, 22a, and 24a are oriented toward oncoming traffic. In the illustrated embodiment, posts 20, 22, and 24 are installed with each post face oriented opposite the orientation of the adjacent post faces, although this is not necessarily required.

FIGS. 3 and 4A-4F depict embodiments of a four-cable barrier assembly or system 100. Examples of the cable barrier system 100 can include one or more of an anchor 117, a weak terminal post 120, and a standard terminal post 122. The terminal ends of cables 112 can be removably mounted to the anchor 117 and removably connected to terminal posts 120, 122 and line posts 124. The cables 112 can be angled upward relative to ground level 128 until the desired distance above ground level 128 is obtained. As shown in FIG. 4A, the cables 112 can alternate on opposite lateral sides of adjacent ones of the line posts 124 (e.g., lines posts 124a, 124b, 124c, 124d). In another version, the cables 112 can all be the same sides of the line posts 124.

Embodiments of each line posts 124 can include a post body 130 (FIG. 4A) secured in the ground as is known in the art. The post body 130 can include an elongated, rectangular profile with an open top 132. Examples of the post body 130 can have a hollow interior and a slot 134 extending along one side of the post body 130. In one version, the slot 134 can extend for the entire length of the post body 130.

Figure 7:
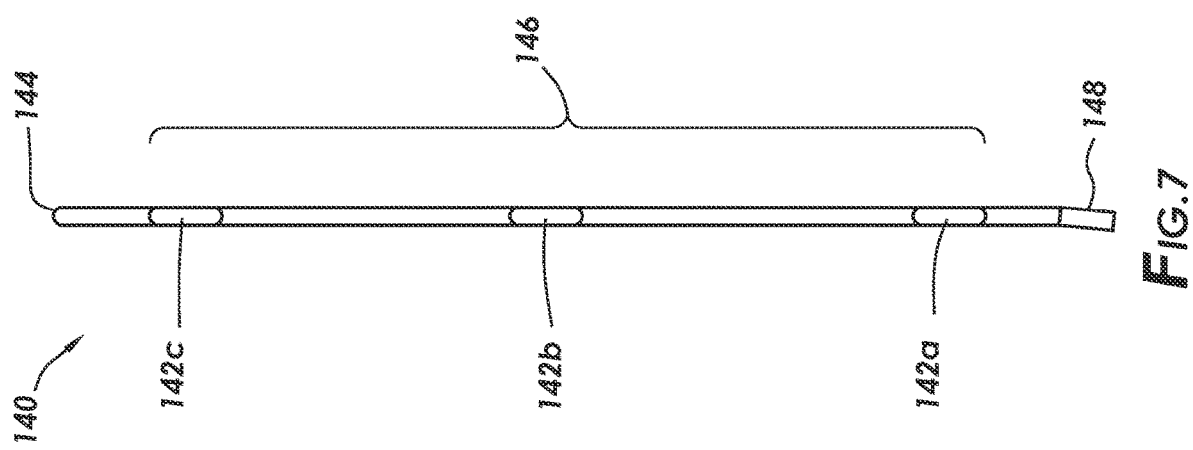
FIG. 7 is a front view of the connector of FIG. 5.

In some versions, a removable connector or hairpin 140 (FIGS. 5-7) can be installed through the top 132 of the line post 124 and into the interior of the post body 130. The hairpin 140 can include cable retention features, such as partial loops or loops 142 that extend to the exterior of the post body 130 through the slot 134. The loops 142 can be used to capture and restrain the cables 112 as described herein. The illustrated example of hairpin 140 can include a lower loop 142a, a middle loop 142b and a top loop 142c. The hairpin 140 also can include a hook 144 at its upper end for engaging and resting on the top 132 of the post body 130. Versions of the hairpins 140 can be constructed from steel or other materials, such as aluminum, to reduce their weight and airborne environmental impact during a vehicle collision with the cable barrier system 100.

Figure 8:
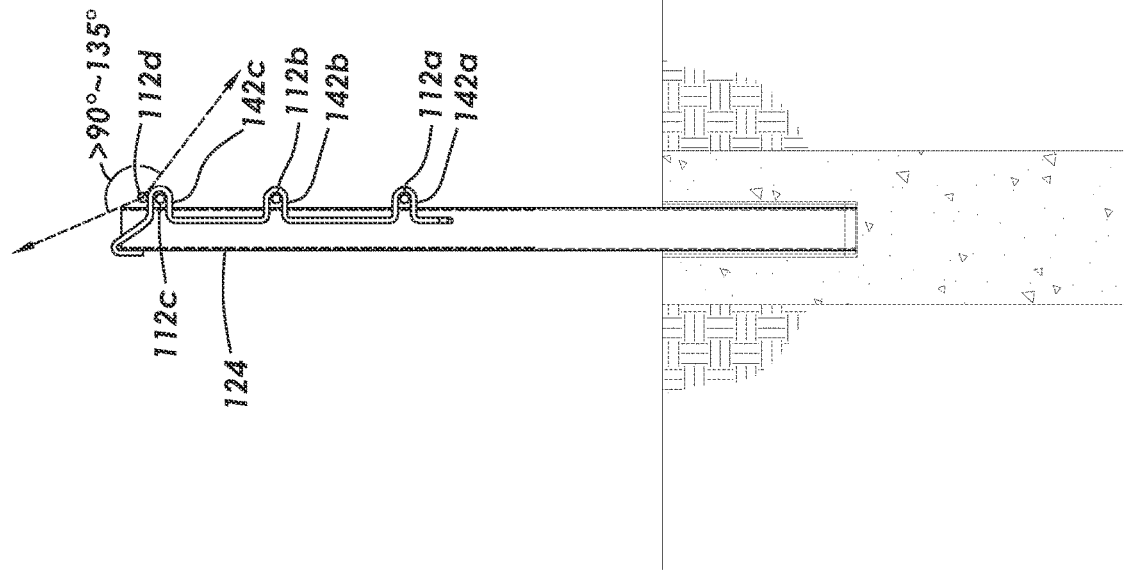
FIG. 8 is a sectional axial view of an embodiment of a cable barrier system through a line post.

In the versions of FIGS. 4A-4F, the cable barrier system 100 can include four cables 112, including a lower cable 112a, a middle cable 112b and two top cables 112c and 112d. In one example, at least two of the cables 112a, 112b are parallel (or substantially parallel, meaning not perfectly parallel in a mathematical sense) to each other along the barrier section. In another example, at least two other ones of the cables 112c, 112d are not parallel to each other (e.g., they can be skewed) along the barrier section. As shown in FIG. 8, embodiments of the cable barrier assembly 100 can include at least some of the cables 112 being secured to each line post 124, and not every line post 124 securing all of the cables 112.

In another example, cables 112c, 112d can be horizontally aligned (FIGS. 4B and 4D) in vertical elevation between adjacent ones of the line posts 124. Some examples of the cables 112c, 112d are not horizontally aligned (FIGS. 4C and 4E) in vertical elevation, such as at the line posts 124. Accordingly, the cables 112c, 112d can be vertically separated from each other (FIGS. 4C and 4E) at the line posts 124. In one embodiment, at the line posts 124, the cables 112c, 112d can be vertically aligned with each other (FIGS. 4C and 4E), such that they are not horizontally offset from each other. Alternatively, at the line posts 124, the cables 112c, 112d can be not vertically aligned with each other, such that they are horizontally offset from each other.

Embodiments of the cable barrier assembly 100 can include the cables 112c, 112d alternating at two different vertical elevations at adjacent ones of the line posts 124. In one version, the cables 112c, 112d can be characterized as not being intentionally horizontal (FIG. 4F) along the barrier section (or intentionally perpendicular to line posts 124), except where they incur inflections at the line posts 124. In contrast, embodiments of the cables 112a, 112b can be intentionally perpendicular to posts 124, and horizontal and/or parallel to the ground 128.

Another version of the cable barrier assembly 100 can include each line post 124 with a total number of cable retention features (e.g., three loops 142) that is less than a total number of the cables 112 (e.g., four cables 112). Examples of each cable retention feature can include at least a partial loop or a loop 142 that limits a range of radial motion of a cable 112 extending through an eye of the loop 142, relative to an axis of the cable 112.

Embodiments of the cable barrier assembly 100 can include two top cables 112c, 112d at a same or substantially same vertical elevation, such as in a plane (e.g., a horizontal or substantially horizontal plane). The two top cables 112c, 112d can be side-by-side, or substantially side-by-side, when away from the line posts 124. Other versions can include a center-to-center spacing 114 (FIGS. 4B and 4C) between the two top cables 112c, 112d, when assembled or installed. For example, the spacing 114 can be not greater than one outer diameter (e.g., 0.75 inches) of the cables 112. In another example, the spacing can be not greater than 1.5 outer diameters, not greater than 2 outer diameters, or even not greater than 4 outer diameters of the cables 112.

In one example (e.g., FIG. 4B), at least portions of the two top cables 112c, 112d can extend parallel or semi-parallel to each other. The term 'semi-parallel' can mean substantially, essentially or mostly parallel. In some versions, the two top cables 112c, 112d can be touching at the same or substantially same vertical elevation (e.g., FIG. 4B), or touching at different vertical elevations (e.g., FIG. 4D). In some versions, the two top cables 112c, 112d can be separated and in vertical alignment (e.g., FIG. C), or separated and not vertically aligned (e.g., FIG. 4E). Examples of the two top cables 112c, 112d can be touching between adjacent ones of the line posts 124, and not touching at the line posts 124, such that the two top cables 112c, 112d are separated, such as vertically separated, from each other at the line posts 124. Between the line posts 124, embodiments of the cables 112a, 112b can be not parallel to the cables 112c, 112d. At the line posts 124, at least portions of the cables 112c, 112d can be parallel to the cables 112a, 112b.

In another example, the two top cables 112c, 112d do not twist with each other. The term 'twist' can be defined as helical or semi-helical interplay. For example, 'one complete twist' can include 360° of helical interplay between or winding of two cables along a helical axis. In some versions (compare FIGS. 4B-4E), the two top cables 112c, 112d twist for not greater than about 90° of twist, not greater than about 135° of twist, or even not greater than about 180° of twist.

In some versions, the two top cables 112c, 112d can alternate (compare FIGS. 4C and 4E) extending (a) through the cable retention features (e.g., loops 142c) on adjacent ones of the line posts 124, and (b) externally and adjacent to the cable retention features (e.g., loops 142c) on adjacent ones of the line posts 124. Examples of the two top cables 112c, 112d can alternate being vertically above and below each other at adjacent ones of the line posts 124.

Accordingly, at each line post 124, one of the cables 112c, 112d can comprise a 'free cable' that is substantially unrestrained (i.e., not captured by a cable retention feature). For example, in FIG. 4C cable 112c is the free cable, whereas cable 112d is the free cable in FIG. 4E. Even though the free cable is substantially unrestrained, it can be located adjacent to an exterior of a cable retention feature. Moreover, the free cable can have a range of freedom of radial motion. For example, the range of freedom of radial motion can be about 90° to about 135° (see FIG. 8), relative to an axis of the free cable.

Other embodiments can include a method for releasably connecting cables to posts in a roadway cable barrier system. For example, the method can include mounting a first cable to a first post such that the first cable is substantially restrained in all radial directions other than upper vertical directions (e.g., not axially restrained or upwardly restrained). That is to say, the eye of loop 142 through which the first cable extends restrains the cable from movement in radial directions extending outward from the long central axis of the first cable; however, because the hairpin 140 in the example embodiment is suspended within the line post 124, movement of the cable vertically may still be possible in spite of the eye of the loop 142 because the entire hairpin 140 may move vertically (and relative to line post 124) if sufficient upward force is applied. Versions of the method can include extending a second cable adjacent to the first post such that the second cable is unrestrained in upper vertical radial directions and in other radial directions. The second cable could be not touching or free of contact with the line post or cable retention feature. The method also can include mounting the second cable to a second post such that the second cable is substantially restrained by the second post. In addition, the method can include extending the first cable adjacent to the second post such that the first cable is substantially unrestrained by the second post. The method can be repeated for subsequent posts after the second post.

Referring again to FIGS. 5-7, embodiments of the hairpin 140 can have a unique geometry that is flatter and has less deviation at its bottom than existing hairpin designs. For example, the hairpin 140 can include an elongated body 146 extending in a single plane and comprising a top (e.g., hook 144), and a plurality of cable retention features (e.g., loops 142), and a lower body 148 that is not co-planar with the elongated body 146. The lower body 146 can comprise a flare extending in only one direction. Versions of the flare can extend at a single, out-of-plane angle. Examples of the single, out-of-plane angle can be about 6° with a tolerance of +5° and −0°. Embodiments of the hairpin 140 can comprise an approximately 7/16" round wire, and examples of the flare can have an out-of-plane dimension of about 9/16" or more. In some versions, the hairpin 140 can have an overall length, and the flare can comprise not greater than about 10% of the overall length, such as not greater than about 5%, and at least about 1% of the overall length of the hairpin 140.

Many of the connections in the drawings are shown as direct couplings having no intervening devices, but not expressly stated as such in the description above. Nevertheless, this paragraph shall serve as antecedent basis in the claims for referencing any connection as "directly coupled" for connections shown in the drawing with no intervening device(s).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A cable barrier assembly, comprising:
a terminal end consisting of an anchor having a leveraging member, a weak terminal post and a terminal post extending along a barrier section;
line posts extending along a remainder of the barrier section, other than the terminal end, and each line post comprises cable retention features; and
cables coupled to each of the anchor, weak terminal post, terminal post and line posts, and the cables comprise two top cables that twist with each other for not greater than 90° of twist about a twist axis of the two top cables, such that the two top cables are on a same side of each line post.

2. The cable barrier assembly of claim 1, wherein the cables consist of three cables.

3. The cable barrier assembly of claim 1, wherein the cables consist of four cables.

4. The cable barrier assembly of claim 1, wherein:
each line post has a total number of the cable retention features that is less than a total number of the cables, and each cable retention feature comprises an at least partial loop that limits a range of radial motion, relative to a centerline axis of a respective one of the cables, of the respective one of the cables that extends through the at least partial loop.

5. The assembly of claim 4, wherein the assembly comprises only four of the cables, and each line post comprises fewer than four of the cable retention features.

6. The assembly of claim 4, wherein the assembly consists of only four of the cables, and each line post consists of only three of the cable retention features.

7. The assembly of claim 1, wherein the two top cables extend semi-parallel to each other, each of the two top cables comprises a cable outer diameter, and a center-to-center spacing between the two top cables is not greater than two of the cable outer diameters.

8. The assembly of claim 1, wherein the two top cables alternately (1) extend through adjacent ones of the cable retention features on the line posts, and (2) extend externally and adjacent to adjacent ones of the cable retention features on the line posts.

9. The assembly of claim 1, wherein, at each line post, a selected one of the two top cables is substantially unrestrained and, relative to the centerline axis of the selected one of the two top cables, the selected one of the two top cables has a range of freedom of radial motion of greater than 90° and up to 135°.

10. The assembly of claim 1, wherein each cable extends and alternates on opposite lateral sides of adjacent ones of the line posts.

11. The assembly of claim 1, wherein:
at least some of the cables are secured to each line post; and
not every line post secures all of the cables.

12. The assembly of claim 1, wherein the two top cables are skewed relative to each other, and two lower cables of the cables are substantially parallel to each other.

13. The assembly of claim 1, wherein the two top cables alternate being vertically above and below each other at adjacent ones of the line posts.

14. A cable barrier assembly, comprising:
a terminal end consisting of an anchor having a leveraging member, a weak terminal post and a terminal post extending along a barrier section;
line posts extending along a remainder of the barrier section, other than the terminal end, and each line post comprises cable retention features; and
cables coupled to each of the anchor, weak terminal post, terminal post and line posts, and the cables comprise two top cables that alternately (1) extend through adjacent ones of the cable retention features on the line posts, and (2) extend externally and adjacent to adjacent ones of the cable retention features on the line posts.

15. A cable barrier assembly, comprising:
a terminal end consisting of an anchor having a leveraging member, a weak terminal post and a terminal post extending along a barrier section;
line posts extending along a remainder of the barrier section, other than the terminal end, and each line post comprises cable retention features; and
cables coupled to each of the anchor, weak terminal post, terminal post and line posts, and the cables comprise two top cables that alternate being vertically above and below each other at adjacent ones of the line posts.

* * * * *